US00RE33811E

United States Patent [19]

Miller

[11] E Patent Number: Re. 33,811

[45] Reissued Date of Patent: Feb. 4, 1992

[54] ACCUMULATING CONVEYOR

[75] Inventor: Jack E. Miller, St. Clair Shores, Mich.

[73] Assignee: Harry Major Machine & Tool Co., Fraser, Mich.

[21] Appl. No.: 419,520

[22] Filed: Oct. 10, 1989

Related U.S. Patent Documents

Reissue of:

[64] Patent No.: 4,776,453
Issued: Oct. 11, 1988
Appl. No.: 72,854
Filed: Jul. 14, 1987

U.S. Applications:

[63] Continuation-in-part of Ser. No. 850,260, Apr. 11, 1986, Pat. No. 4,681,212, which is a continuation-in-part of Ser. No. 761,584, Aug. 1, 1985, Pat. No. 4,598,818.

[51] Int. Cl.[5] ..... B65G 25/00

[52] U.S. Cl. ..... 198/803.2; 198/465.1; 198/465.3

[58] Field of Search ..... 198/803.2, 465.1, 465.3

[56] References Cited

U.S. PATENT DOCUMENTS

| | | | |
|---|---|---|---|
| 3,319,765 | 5/1967 | Hasenwinkle et al. | 198/460 |
| 3,949,859 | 4/1976 | Nussbaumer et al. | 198/803.2 X |
| 4,060,164 | 11/1977 | Reilly | 198/465.3 X |
| 4,088,220 | 5/1978 | Jacksch et al. | 198/803.2 |
| 4,461,216 | 7/1984 | Carney | 198/465.1 X |
| 4,527,611 | 7/1985 | Clark | 198/465.1 X |
| 4,598,818 | 7/1986 | Miller | 198/803.2 |
| 4,681,212 | 7/1987 | Miller | 198/803.2 |

FOREIGN PATENT DOCUMENTS

| | | | |
|---|---|---|---|
| 3029620 | 3/1982 | Fed. Rep. of Germany | 198/803.2 |
| 0011581 | 1/1977 | Japan | 198/465.1 |
| 0048125 | 4/1980 | Japan | 198/465.3 |

*Primary Examiner*—Robert P. Olszewski
*Assistant Examiner*—James R. Bidwell
*Attorney, Agent, or Firm*—Basile and Hanlon

[57] ABSTRACT

An accumulating endless roller chain conveyor is provided with independently moable, article supporting pallets or carriers mounted upon the roller chains to be frictionally conveyed with the continuously driven chains along the horizontal upper and lower runs of the chains and to be positively coupled to the chains while moving around the end sprockets of the conveyor between the upper and lower runs by the biasing force imparted by a resilient surfaced wheel. The carriers may be stopped at any point along the upper or lower runs without interfering with the continuous movement of the chains.

13 Claims, 3 Drawing Sheets

ACCUMULATING CONVEYOR

Matter enclosed in heavy brackets [ ] appears in the original patent but forms no part of this reissue specification; matter printed in italics indicates the additions made by reissue.

REFERENCE TO RELATED APPLICATION

This application is a continuation-in-part of my copending application Ser. No. 850,260 filed Apr. 11, 1986 now U.S. Pat. No. 4,681,212, which is a continuation-in-part of application Ser. No. 761,584, filed Aug. 1, 1985, now U.S. Pat. No. 4,598,818.

BACKGROUND OF THE INVENTION

1. Field of the Invention

The present invention is directed to an accumulating conveyor upon which articles may be stored or accumulated to be advanced to a work station only when the work station is ready to receive an article.

2. Description of the Prior Art

A typical application of such conveyor is in a production line where, due to the nature of an operation performed on the article at the work station, the rate at which articles are discharged from the work station is a variable rate or a rate which is less than the rate at which articles can be supplied to the work station. When the work station is occupied, the conveyor functions to halt the flow of articles to the work station, thus accumulating a line of articles upstream from the work station so that articles can be supplied to the work station as fast as the work station is ready to accept them. The basic requirement of such a conveyor is that it must be able, while being continuously operated to advance articles intermittently in accordance with the requirements of the work station.

In the prior art, a walking beam type conveyor is conventionally used to perform the foregoing function. Uniformly spaced article receiving seats are located along the fixed frame of the conveyor and a lift-and-carry mechanism is associated with each seat which is operable in a cyclic sequence to lift and carry an article from one seat to the next advanced seat to advance the articles in step-by-step movement along the conveyor. The various lift-and-carry mechanisms are interlinked with each other so that only those lift-and-carry mechanisms which are upstream from an empty seat will be actuated to advance articles in an operating cycle. Prior art examples of such conveyors are found in U.S. Pat. Nos. 4,441,606 and 4,240,542.

While the walking beam type accumulating conveyor is widely used, it possesses certain inherent drawbacks. A lift-and-carry mechanism must be provided at each station, together with a sensing mechanism at each station which detects the presence or absence of a part or article at that station and signals all upstream stations as to whether they are to act in the transfer or non-transfer mode during the next cycle. The intermittent step-by-step operation relies upon a reciprocatory drive mechanism which subjects a multitude of interconnected system parts to impact loading at stroke reversal and which is subjected to variable loading, depending upon the number of parts which are to be advanced, upon the actuating stroke. The articles conveyed in turn must be bodily lifted from the conveyor frame, advanced, and then lowered gently back onto the conveyor frame a substantial number of times in order to transmit the conveyor.

The accumulating conveyor of my U.S. Pat. No. 4,598,818 was designed to overcome these problems. It employs a pair of multiple strand roller chains operatively trained about paired end sprockets for coordinated movement along an endless path having horizontal upper and lower runs extending between the end sprockets. One strand of each roller chain is operatively trained about one set of end sprockets while a second strand of each chain is supported laterally clear of the end sprockets and track means employed to support and guide the chains along their upper by lower runs. A plurality of article carriers are mounted to extend between the two chains and to be supported from the second strands of the chains by outer and inner support plates fixedly mounted at the opposite sides of each carrier. The outer support plates support the carriers upon the chains during transit of the upper run while the inner support plates suspend the carriers in an inverted position during transit of the lower run by the frictional engagement of chain engaging edges on the plates with the chain rollers. The chain is continuously driven and, because of the frictional coupling between the carriers and chains, carriers may be accumulated or held stationary by suitable stops at selected locations along either the upper and lower run.

To transfer carriers around the curved portions of the chain path defined by the end sprockets, the spacing and configuration of the opposed edges of the inner and outer support plates are designed to automatically positively couple the carrier to the chain as the carrier moves from the upper or lower run into the curved portions of the chain path.

The length of the straight edge section of the inner plate, its spacing from the opposed straight edge section of the outer plate, and the inclination of the beveled edge sections of the inner plate are related to the end sprocket radius and the pitch of the chain in a fashion such that when the carrier moves onto the curved portions of the endless path defined by the end sprockets, the corners at the junctures of the straight edge section and beveled edge sections of the inner plate project into the spaced between two adjacent rollers of the chain and are positively held in this position by the tangential engagement of the straight edge of the outer plate with a roller midway between those two sets of rollers engaged by the inner plate. This action provides a positive coupling between the carrier and the chain as the carrier transmits the curved portions of the endless path so that the carriers can be transported from the lower run upwardly around one set of end sprockets to the upper run and be restricted to movement with the chain as the carrier is passed downwardly around the other end sprockets from the upper run to the lower run.

My U.S. Pat. No. 4,681,212 represents a further refinement to the above described system. In the U.S. Pat. No. 4,681,212, the carrier is positively coupled to the chains during transit of the curved portions of the path defined by the sprocket means by concave recesses at opposite ends of the straight edge section of the inner support plate. The rollers of the chain are seated and held by the tangential engagement of the straight edge of the opposed outer plate with a roller intermediate the seated rollers.

While the accumulating conveyors disclosed in my above-referenced patents are successful in overcoming the problems cited with the prior art, they do require that the spacing between the chain engaging edges, the length of the straight edge section and beveled edge sections of the inner plate, the radius of the sprocket means, the pitch of the chains, and the size of the concave recesses exhibit particular and fixed relationships to each other. Hence, the tolerance permitted in the sizes and spacings of the various components is relatively small. This factor can make these conveyors relatively expensive to manufacture and difficult to set up and operate.

The present invention is designed to overcome this problem.

SUMMARY OF THE INVENTION

In accordance with the present invention, a resiliently surfaced wheel is mounted for rotation about each of the axes about which the end sprocket rotate. The resiliently surfaced wheel is positioned on the axis for engagement with the wheel engaging edge of the inner support plate on a carrier of the type described above when the carrier is in transit. On the opposite edge of the inner support plate from the chain engaging edge is formed a wheel engaging edge in parallel and spaced apart relation therefrom. The radius of the wheel exceeds the distance between the respective axis and the wheel engaging edge of the inner support plate of the carrier at its closest approached thereto so as to bias the chain engaging edge against the chain and prevent vertical slippage between the chain engaging edge of the carrier and the chain as the carrier travels around the end sprockets from the upper run of the conveyor to the lower run, and vice-versa.

Because of the biasing force transmitted by the resilient surface of the wheel as it rotates, the chain engaging edge will firmly engage *against* the rollers of the chain[.] *while the carrier travels around the end sprockets.* Because [the] *a* resiliently surfaced wheel is [provided to the conveyor at] *associated with* each *end* sprocket [end thereof], the biasing force comes into effect precisely when needed, that is, when the carrier is subject to vertical slippage [with respect to the chain because it is negotiating the vertical distance between two horizontal levels of the conveyor] —*i.e., slippage along the chain—induced by gravity as the carrier moves upwardly or downwardly around the end sprockets between the upper and lower runs of the chains.*

While [it is believed that] the biasing force [alone provided by] *exerted on the carrier by* the resiliently surfaced wheel [is] *may be* sufficient [, in most cases, adequately] to prevent the vertical slippage, [it may also be advantageous to shape] *by shaping* the chain engaging [surface] *edge* of the inner plate in the manner described in my U.S. Pat. No. 4,598,818 [. Thus, the chain engaging surface may comprise a straight section with two beveled edge sections. [This design will serve to cause even more secure engagement between the chain and the biased chain engaging surface of the inner support plate.] *the inner support plate can act as a positive stop limiting such slippage.*

Other objects and features of the invention will become apparent by reference to the following specification and to the drawings.

Figure 1:
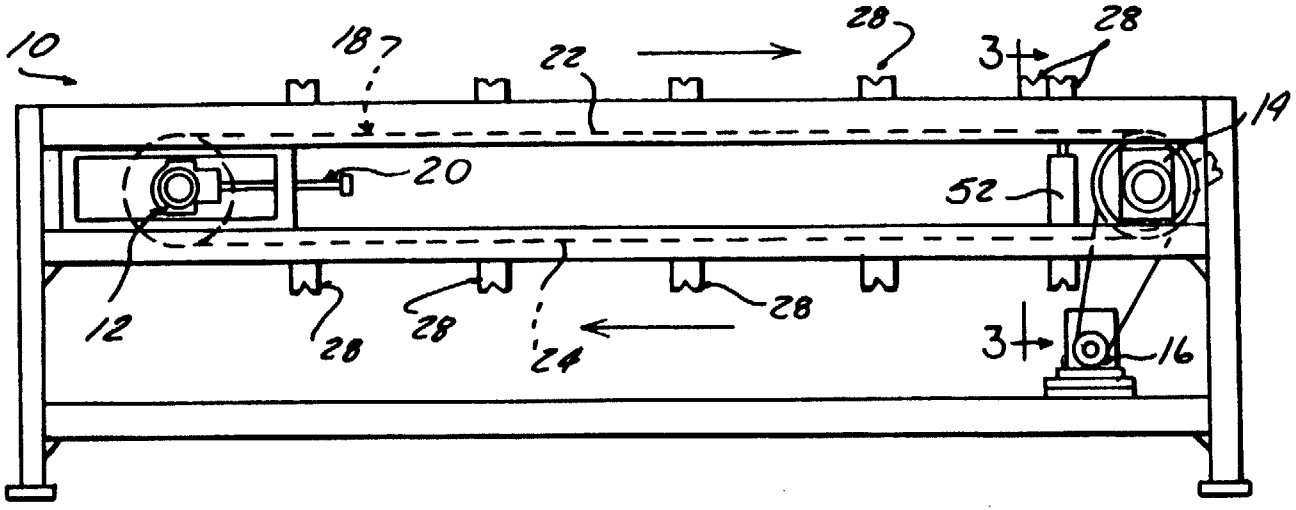
FIG. 1 is a side elevational view of an accumulating conveyor embodying the present invention.
Figure 2:
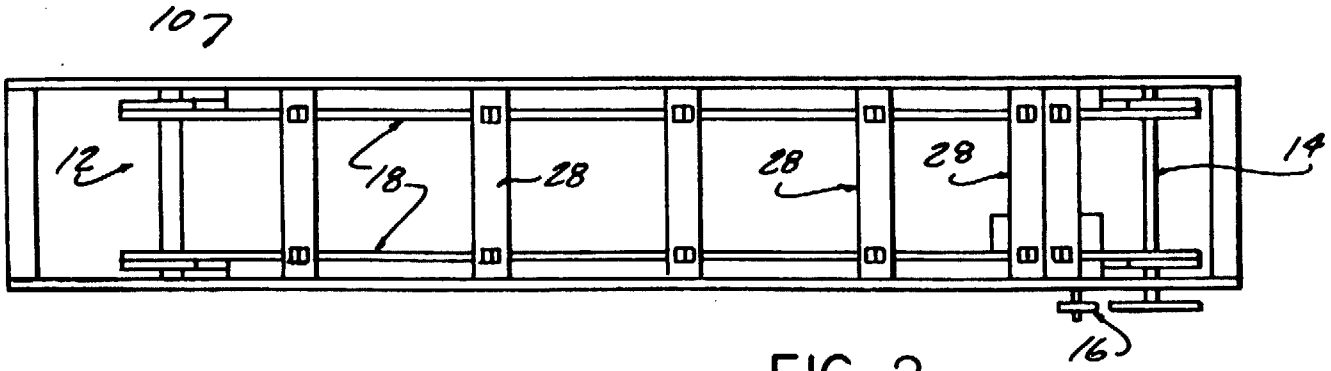
FIG. 2 is a top plan view of the conveyor of FIG. 1.
Figure 3:
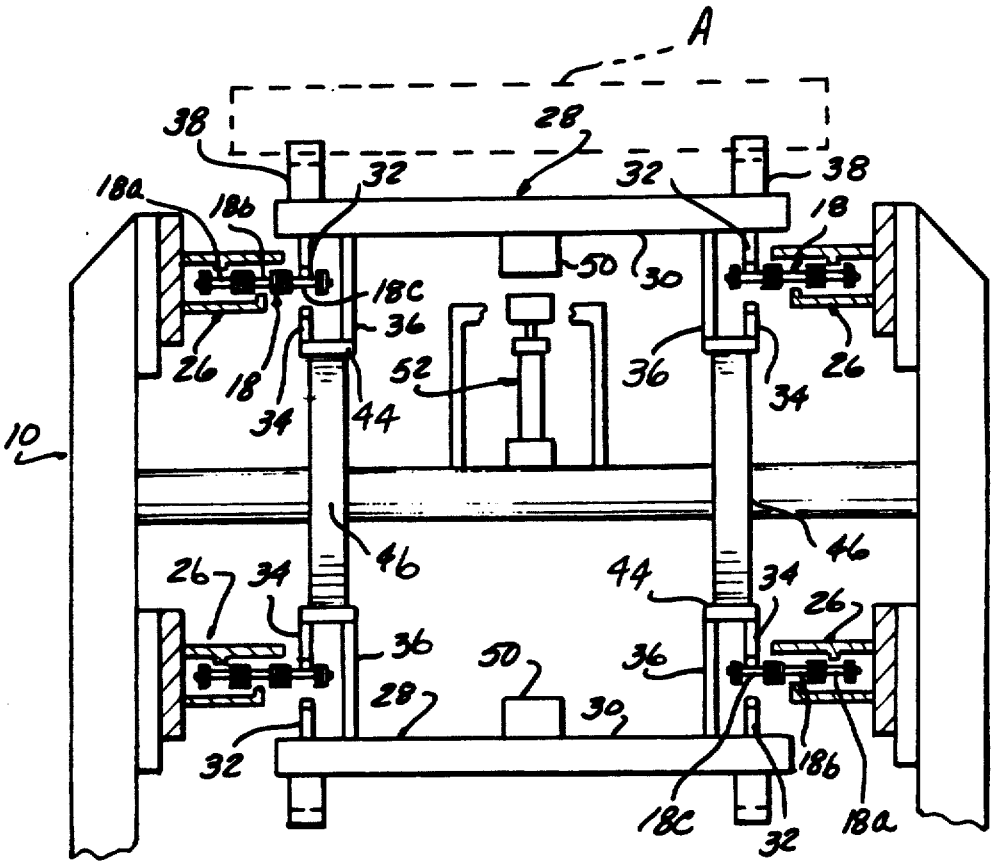
FIG. 3 is a detailed transverse cross-sectional view of the conveyor taken on line 3—3 of FIG. 1.

The overall arrangement of the accumulating conveyor shown in FIGS. 1-3 of the drawings is very similar to that disclosed in my aforementioned U.S. Pat. No. 4,598,818. The conveyor includes a frame designated generally 10 upon which are rotatably mounted two paired sets of end sprockets 12 and 14, end sprocket set 14 being coupled to an insertable drive means designated generally 16. A pair of endless multiple strand roller chains 18 are operatively trained about end sprocket sets 12 and 14 and are maintained in tension by a suitable chain tensioning device of conventional construction designated generally by 20 which is operatively coupled to end sprocket set 12. The sprockets of sprocket sets 12 and 14 are all of like radius and the chain 18 extends between sprocket sets 12 and 14 in horizontal upper and lower runs 22 and 24, shown in FIG. 1.

Referring now to FIG. 3, it is seen that the multiple strand chains 18 take the form of a triple strand roller chain having strands 18a, 18b and 18c. The strands 18a and 18b are supported and guided in their movement along upper and lower runs 22 and 24 of the endless chain path by chain guarding tracks designated generally 26 which are fixedly mounted upon frame 10 of a conveyor to slidably receive and guide the strands 18a and 18b of the chain. Tracks 26 extend substantially the entire length of the upper runs 22 and 24 but terminate short of the respective end sprockets. One or both of the strands 18a and 18b are in mesh with the sprockets. The third strand 18c of the chain projects laterally clear of the tracks 26 and is likewise laterally offset from, and does not engage with, any of the sprocket sets 12 or 14. Strands 18c are employed to support and convey article carriers designated generally 28, along the endless chain path.

Figure 4:
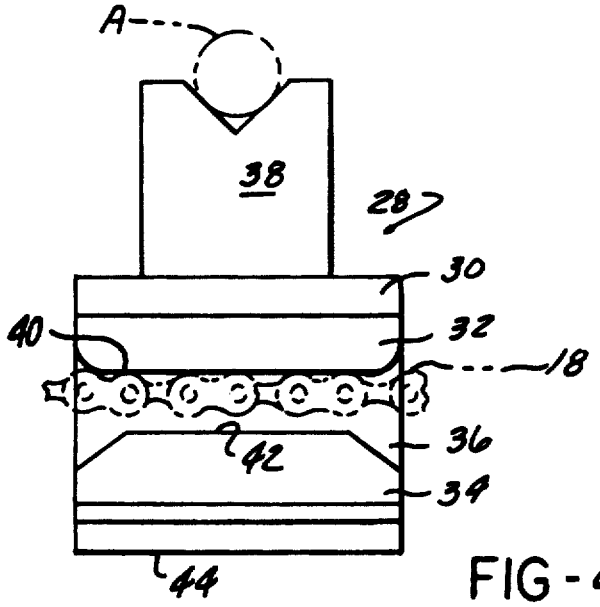
FIG. 4 is a detailed side elevational view of a carrier embodying the present invention.

Referring now particularly to FIGS. 3 and 4, each article carrier 28 includes a main frame member 30 which, as best seen in FIG. 3, extends transversely of the conveyor between the two chains 18. Outer support plates 32 are fixedly mounted upon frame member 30 adjacent each end of member 30 in vertical alignment with strand 18c of the respective chains, and inner support plates 34 are likewise fixedly mounted upon frane member 30 adjacent each end of the frame member as by mounting brackets 36 to be vertically aligned with strands 18c of the chain and with the associated outer support plate 32. Article supporting cradles 38 are fixedly mounted on carrier frame member 30 and suitably conformed to support an article such as A indicated by broken line in FIGS. 3 and 4 upon the carrier.

Figure 5:
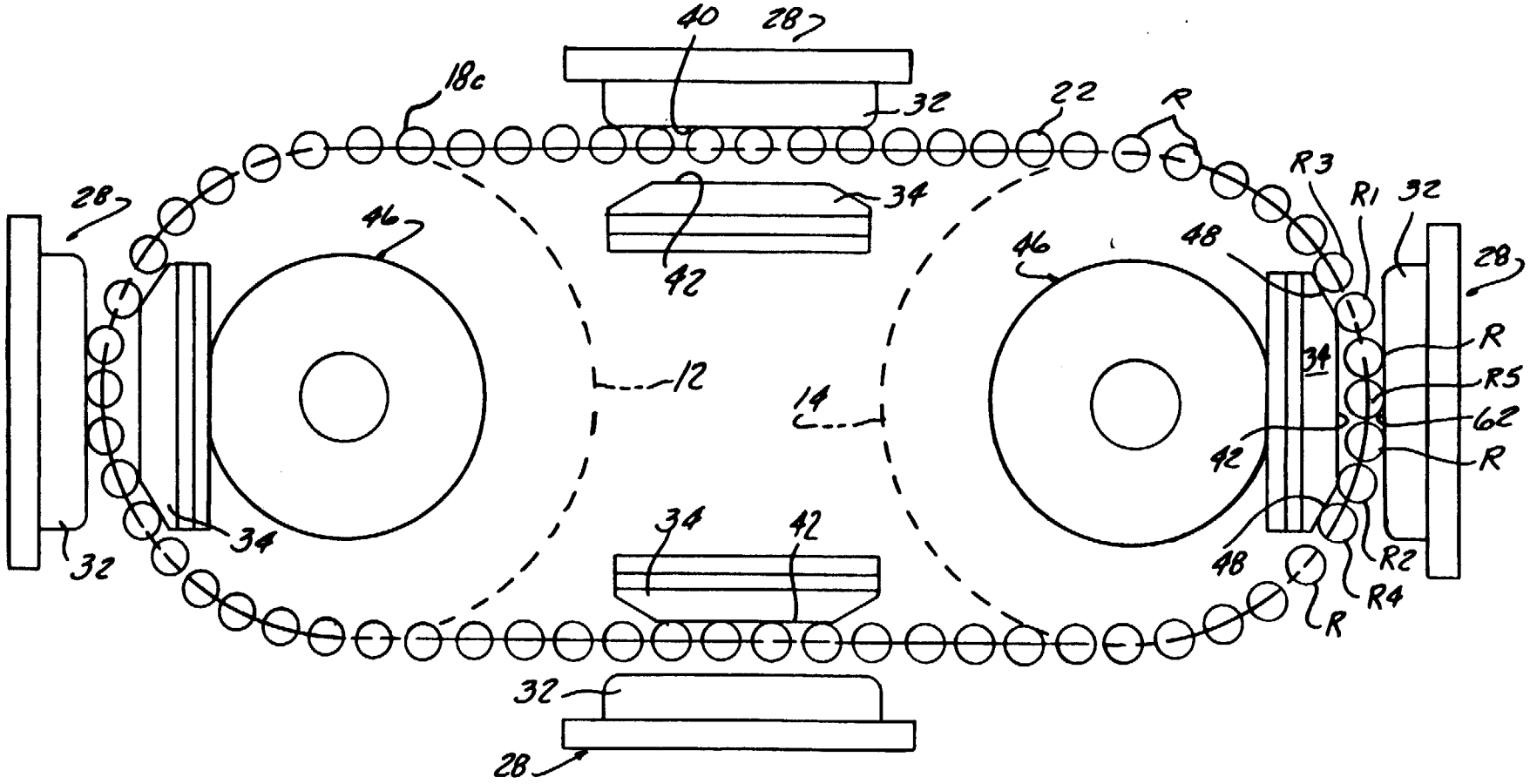
FIG. 5 is a schematic diagram showing the relationship between the carrier support plates and chain at various locations along the endless path of the chain.

As best seen in FIG. 4, support plates 32 and 34 are formed with spaced parallel edges 40 and 42 respectively, these edges being spaced from each other by a distance greater than the diameter of the rollers of chain 18. As best seen in FIG. 5, when a carrier 28 is on the upper run 22 of chain 18, it is supported on the chain by the engagement of the edges 40 of outer support plates 32 upon rollers R of the inner strand 18c of the chain. When the carrier is on the lower run 24 of the chain, it is suspended in an upside-down position with the edges 42 of its inner support plates 34 resting upon the inner strand of the chain. As best seen in FIGS. 4 and 5, the length of the straight chain engaging edge 40 of outer support plate 32 is sufficient to span several rollers of chain 18 when on the upper run so that the carrier 28 is safely supported upon the chains. The precise length of the straight chain engaging edge 40 of outer plates 32 is not critical, but for practical purposes should be long enough to engage at least three rollers of the chain when the carrier is on the upper run; that is, the length of edge 40 will exceed three times the chain pitch.

As can be seen in FIG. 4, inner support plate 34 is formed with a wheel engaging edge 44 which is in parallel and spaced apart relation to chain engaging edge 42. A resiliently surfaced wheel 46, shown in FIGS. 3 and 5 (preferably comprised of a deformable substance such as rubber), is mounted for rotation about each of the axes of end sprockets 12, 14 and positioned thereon for engagement with the wheel engaging edge 44 of inner support plate 34. The radius of wheel 46 exceeds the distance between the respective sprocket axis and the wheel engaging edge 44 at its closest approach to the sprocket axis during travel of the carrier 28, as can be seen in FIG. 5.

When a carrier 28 is located on either the upper or lower run of the chains 18, movement of the chains 18 will normally advance the carrier 28 with the chain by virtue of the friction between the chain rollers and the engaged support plate. However, if the carrier 28 is physically restrained by some external force against movement with the chain along either of these horizontal runs, the chain is free to move, relative to the carrier, with the rollers of strand 18c rolling along the flat surface 40 (or 42) of the engaged support plate. At the opposite ends of the flat chain engaging edge 42 of inner support plate 34, beveled edge sections 48 may be provided. Beveled edge sections 48 are inclined from the flat edge section 42 at an inclined obtuse angle (typically but not necessarily about 150°) for a reason to be described below. Similar bevels may be provided on the outer support plate 32 in order that the inner and outer support plates may be of the same size and shape to simplify part replacement; however, the beveled edge sections, if provided, have a function only on the inner support plates 34.

When it is desired to accumulate articles conveyed along the upper run 22 of the conveyor, a stop designated generally 52 (FIGS. 1 and 3) is elevated to engage a stop plate 50 (FIG. 3) on a carrier 28, and the carrier engaged by the stop is held stationary on the upper run of the chains 18 which continue to move; the rollers of the chain rolling along the straight edges 40 of the outer support plates 32. Carriers 28 can thus be accumulated as desired.

Referring now to FIG. 5, when a carrier 28 is located on the lower run 24 of the chain 18, the straight edge section 42 of inner support plate 34 rests upon a plurality of rollers R to suspend the carrier in an inverted position from the lower run of the chain. [Again, carriers on the lower run may either move with the chain or may be accumulated by the provision of a suitably located stop (not shown).]

The present invention is primarily concerned with assuring a controlled [driving] movement—*i.e., no slippage relative to the chain*—of the carriers 28 as they pass *upwardly or downwardly* around sprockets 12, 14 between the upper and lower runs of the chain path.

This can be seen in FIG. 5; when a carrier 28 reaches the end of either the horizontal upper run 22 or the horizontal lower run 24 [thus reaching the arcuate areas of the conveyor adjacent the sprockets 12 and 14, its] *and begins to enter a curved portion of the chain path, the* wheel engaging edge 44 will come into engagement with the resilient surface of wheel 46. Due to the resiliency of the surface of wheel 46, a biasing force will urge *edge 42 of* inner support plate 34 [in a radial direction outward. This will cause chain engaging edge 42 to firmly contact at least some of the rollers R, such as R3, R1, R2 and R4.] *outwardly against the chain rollers.*

*The dimensions and configuration of the edges 42 and 48 of inner support plate 34 are selected so that when the carrier is located on a curved portion of the chain path, the lowermost end of the flat edge 42 will tangentially engage one roller, such as roller R2 (FIG. 5), and the adjacent bevelled edge 48 will rest upon the next adjacent roller R4 in the same manner as described and shown in my U.S. Pat. No. 4,598,818.*

*The engagement between the periphery of the wheel and carrier 28 maintains the lower bevelled edge 48 in contact with roller R4. This provides a positive drive coupling between the chain (at roller R4) and carrier (at the lower bevelled edge 48) to drive the carrier upwardly (or to control movement of the carrier downwardly) around an end sprocket.* Hence, undesirable vertical slippage between inner support plate 42 and chain 18 will be prevented.

As shown in FIG. 5, the beveled edges 48 of chain engaging edge 42 enhance the engagement of chain engaging edge 42 with chain 18. However, it is not critical that bevels 48 be present on chain engaging edge [42]. Chain engaging edge 42, *48* may exhibit a variety of shapes, *other than a straight edge terminating at either end with a bevelled edge,* such as a straight section with rounded corners or a straight section with square corners, etc.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

I claim:

1. For use in combination with an accumulating conveyor comprising a pair of like end sprocket means of like radius mounted for rotation about spaced, parallel, horizontal axes, an endless multiple-strand roller chain, at least one strand of said chain being operatively trained in tension about said end sprocket means, means for supporting and guiding said one strand of said chain along horizontal upper and lower runs extending between said sprocket means, a second strand of said chain being supported by said one strand laterally clear of said sprocket means and said means for supporting and guiding, and drive means for driving said chain in continuous movement along an endless path;

an article carrier adapted to be mounted on said second strand of said chain, said carrier including mounting means mounted on the carrier and engaged with said second strand to support the carrier upon said second strand and operable to frictionally couple the carrier to said chain when the carrier is on the upper or lower run of the chain, said carrier having a frame and said mounting means comprising a rigid outer support plate and a rigid inner support plate fixedly mounted on said frame to be respectively located at the outer and inner side of the endless path of movement of said second strand, said support plates having opposed chain engaging edges; and said [inner support plate] *carrier* having a wheel engaging surface in parallel and spaced apart relation to the chain engaging edge [thereof;] *of said inner support plate;* a wheel means mounted for rotation about each of said axes;

[a resilient] means [disposed] *engaged* between said [each of said axes] *said wheel means* and said wheel engaging surface [of] *for urging* said inner support plate *against said chain;* said wheel means positioned for engagement with the wheel engaging surface of the [inner support plate] *carrier* during transit [thereof, the radius of said wheel and said resilient means exceeding the distance between the respective axis and the wheel engaging edge at its closest approach to said axis during travel of the carrier] *of the carrier about the axis of the wheel means* so as to [bias] *hold* the chain engaging edge *of said inner support plate* against the chain and prevent slippage therebetween during travel of the carrier from the upper to the lower run and from the lower to the upper run.

2. The invention defined in claim 1, wherein said multiple-strand chain is a triple-strand chain, said means for supporting and guiding comprising a first guide member engageable with the rollers of one strand of said chain at the outer side of said endless path, and a second guide member engageable with the rollers of another strand of said chain at the inner side of said endless path.

3. The invention defined in claim 1 further comprising retractable stop means mounted on a conveyor frame at a location on said upper run and operable in an extended position to positively stop movement of a carrier at a selected location on said upper run while accommodating continuous movement of said chain.

4. The invention defined in claim 1, wherein the chain engaging edges include opposed straight edge sections extending in fixed, spaced relationship to each other and spaced from each other by a distance greater than the diameter of the rollers of said chain, the straight edge section of said outer support plate having a length sufficient to span a plurality of rollers of said chain to stably support said carrier upon said second strand of said chain when said carrier is located on said upper run and the straight edge section of said inner plate having a length sufficient to span a plurality of rollers of said chain to stably support said carrier upon said second strand when said carrier is located on said lower run, said chain engaging edge of said inner plate terminating at opposite ends in beveled edge sections inclined from the straight edge section inwardly of said endless path at an obtuse included angle, [the fixed spacing between the chain engaging edges of said inner and outer plates and] the length of the straight edge section of said inner plate being related to the radius of said sprocket means and the pitch of said chain such that during transit of said plates around the curved portions of said endless path defined by said sprocket means [said edge on said outer plate contacts the outer side of one roller of said second strand,] the chain engaging edge section of said inner plate contacts at least two rollers of said second strand [respectively spaced ahead and behind said one roller with respect to the direction of travel of said chain,] and at least one beveled edge section of said chain engaging edge of said inner plate simultaneously engages a roller of said second strand adjacent one of said two rollers.

5. The invention defined in claim 1, wherein said resilient means is fixedly attached to the outer surface of said wheel means to form a resiliently surfaced wheel means.

6. For use in combination with an accumulating conveyor comprising a pair of like end sprocket means of like radius mounted for rotation about spaced, parallel, horizontal axes, an endless multiple-strand roller chain, at least one strand of said chain being operatively trained in tension about said end sprocket means, means for supporting and guiding said one strand of said chain along horizontal upper and lower runs extending between said sprocket means, a second strand of said chain being supported by said one strand laterally clear of said sprocket means and said means for supporting and guiding, and drive means for driving said chain in continuous movement along an endless path;

an article carrier adapted to be mounted on said second strand of said chain, said carrier including mounting means mounted on the carrier and engaged with said second strand to support the carrier upon said second strand and operable to frictionally couple the carrier to said chain when the carrier is on the upper or lower run of the chain, said carrier having a frame and said mounting means comprising a rigid outer support plate and a rigid inner support plate fixedly mounted on said frame to be respectively located at the outer and inner side of the endless path of movement of said second strand, said support plates having opposed chain engaging edges; and said [inner support plate] *carrier* having a wheel engaging edge in parallel and spaced apart relation to the chain engaging edge [thereof] *of said inner support plate;* a [resiliently surfaced] wheel mounted for rotation about each of said axes and positioned thereon for engagement with the wheel engaging edge of the [inner support plate] *carrier* during transit [thereof, the radius of said wheel exceeding the distance between the respective axis and the wheel engaging edge at its closest approach to the axis during travel of the carrier] *of the carrier about the axis of the wheel* so as to [bias] *hold* the chain engaging edge *of the inner support plate* against the chain and prevent slippage therebetween during travel of the carrier from the upper to the lower run and from the lower to the upper run.

7. The invention defined in claim 6 wherein said multiple-strand chain is a triple-strand chain, said means for supporting and guiding comprising a first guide member engageable with the rollers of one strand of said chain at the outer side of said endless path, and a second guide member engageable with the rollers of another strand of said chain at the inner side of said endless path.

8. The invention defined in claim 6 further comprising retractable stop means mounted on a conveyor frame at a location on said upper run and operable in an extended position to positively stop movement of a carrier at a selected location on said upper run while accommodating continuous movement of said chain.

9. The invention defined in claim 6 wherein the chain engaging edges include opposed straight edge sections extending in fixed, spaced relationship to each other and spaced from each other by a distance greater than the diameter of the rollers of said chain, the straight edge section of said outer support plate having a length sufficient to span a plurality of rollers of said chain to stably support said carrier upon said second strand of said chain when said carrier is located on said upper run and the straight edge section of said inner plate having a length sufficient to span a plurality of rollers of said chain to stably support said carrier upon said second strand when said carrier is located on said lower run, said chain engaging edge of said inner plate terminating at opposite ends in beveled edge sections inclined from the straight edge section inwardly of said endless path at an obtuse included angle, [the fixed spacing between the chain engaging edges of said inner and outer plates and] the length of the straight edge section of said inner plate being related to the radius of said sprocket means and the pitch of said chain such that during transit of said plates around the curved portions of said endless path defined by said sprocket means [said edge on said outer plate contacts the outer side of one roller of said second strand,] the chain engaging edge section of said inner plate contacts at least two rollers of said second strand [respectively spaced ahead and behind said one roller with respect to the direction of travel of said chain,] and at least one beveled edge section of said chain engaging edge of said inner plate simultaneously engages a roller of said second strand adjacent one of said two rollers.

*10. In a conveyor wherein a roller chain is driven in movement along a fixed path lying in a vertical general plane and wherein said path includes a horizontal straight portion tangentally merging with a curved portion lying at a constant radial distance from a horizontal axis normal to said plane, and an article carrier including a rigid support plate having an elongate flat chain engaging edge adapted to rest upon that side of said chain at the radially inner side of said curved portion of said path to support said carrier upon said chain and frictionally couple said carrier to said chain for movement therewith along said straight portion of said path, said flat edge terminating at each end at an end edge inclined from said flat edge away from said chain, said flat edge having a length related to the pitch of said chain and the radius of said curved portion of said path such that when said carrier is on said curved portion of said path the opposite end portions of said flat edge span two non adjacent rollers of said chain and the lowermost end of said flat edge and the adjacent end edge project beyond the lower one of said two non adjacent rollers into the space between said lower one of said rollers and the next lower of said chain roller;*

*the improvement comprising a rotary member mounted for rotation about said axis coordinated with the movement of said chain along said path, and abutment means on said carrier engagable with said rotary member during movement of said carrier along said curved portion of said path for maintaining said flat edge in engagement with at least one said lower one of said two non adjacent rollers throughout movement of said carrier along said curved portion of said path.*

*11. The invention defined in claim 10 wherein said rotary member is formed with a peripheral surface lying at a constant radial distance from said axis and said abutment means on said carrier comprises a flat surface parallel to said flat edge of said support plate.*

*12. The invention defined in claim 11 wherein at least one of said surfaces is defined by a resilient member.*

*13. The invention defined in claim 12 wherein said resilient surface is located on said rotary member.*

* * * * *